United States Patent
Doshin

(10) Patent No.: US 9,667,844 B2
(45) Date of Patent: May 30, 2017

(54) ELECTRONIC APPARATUS PROVIDED WITH A PLURALITY OF TIERS OF ROTATION OPERATION MEMBERS

(71) Applicant: CANON KABUSHIKI KAISHA, Tokyo (JP)

(72) Inventor: Katsuhiro Doshin, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,060

(22) Filed: Aug. 26, 2015

(65) Prior Publication Data

US 2016/0065800 A1    Mar. 3, 2016

(30) Foreign Application Priority Data

Aug. 29, 2014   (JP) ................. 2014-175510

(51) Int. Cl.
   *H04N 5/225*  (2006.01)

(52) U.S. Cl.
   CPC ......... *H04N 5/2252* (2013.01); *H04N 5/2251* (2013.01)

(58) Field of Classification Search
   CPC .. H04N 5/2252; H04N 5/2251; H04N 5/2253; H04N 5/2254; B60K 37/06; B60K 2350/102; G05G 1/08; G05G 5/03; H01H 19/11; H01H 19/14; H01H 3/08; H01H 3/12; H01H 25/06; H01H 25/065; H01H 2239/006; B29C 45/2673; G03B 17/02; G03B 17/18; G06F 3/0362
   USPC .................................................. 348/373–376
   See application file for complete search history.

(56) References Cited

U.S. PATENT DOCUMENTS

| | | | | |
|---|---|---|---|---|
| 5,950,035 A * | 9/1999 | Sakamoto | ............. | G03B 17/00 116/305 |
| 6,067,424 A * | 5/2000 | Shono | .................... | G03B 17/00 200/336 |
| 6,341,202 B1 * | 1/2002 | Hosokawa | ............ | G03B 17/00 396/281 |
| 6,621,016 B2 * | 9/2003 | Ohba | ................... | H01H 25/041 200/11 R |
| 8,363,159 B2 * | 1/2013 | Hyodo | .................. | G03B 17/00 348/373 |
| 8,686,306 B2 * | 4/2014 | Harris | .................... | B60K 37/06 200/336 |

(Continued)

FOREIGN PATENT DOCUMENTS

JP    2010-067391 A    3/2010

*Primary Examiner* — Pritham Prabhakher
(74) *Attorney, Agent, or Firm* — Cowan, Liebowitz & Latman, P.C.

(57) ABSTRACT

A mechanism that achieves size reduction of an electronic apparatus by reducing the axial size of a plurality of tiers of rotation operation members that can be rotationally operated independently of each other. An electronic apparatus includes a holder fixed to an exterior member thereof, a mode dial rotatably supported by the holder, and an exposure correction dial disposed in a manner axially opposed to the mode dial and rotatably supported by the holder. A first click mechanism generates a click force when the mode dial is rotated, and a second click mechanism generates a click force when the exposure correction dial is rotated. The first click mechanism and the second click mechanism are arranged in a space in which the mode dial and the exposure correction dial are axially opposed to each other.

7 Claims, 6 Drawing Sheets

(56) References Cited

U.S. PATENT DOCUMENTS

| | | | | |
|---|---|---|---|---|
| 8,912,457 B2* | 12/2014 | Tseng | .................... | G06F 3/0488 |
| | | | | 200/329 |
| 2002/0089591 A1* | 7/2002 | Kurahashi | .......... | H04N 5/23241 |
| | | | | 348/207.99 |
| 2005/0201746 A1* | 9/2005 | Kurosawa | .......... | H04N 5/23203 |
| | | | | 396/543 |
| 2010/0060782 A1* | 3/2010 | Hyodo | ................. | H04N 5/2252 |
| | | | | 348/373 |
| 2011/0048912 A1* | 3/2011 | Yasuda | ................ | H03K 17/968 |
| | | | | 200/5 A |
| 2013/0208177 A1* | 8/2013 | Kobayashi | ......... | H04N 5/23296 |
| | | | | 348/347 |

* cited by examiner

ELECTRONIC APPARATUS PROVIDED WITH A PLURALITY OF TIERS OF ROTATION OPERATION MEMBERS

BACKGROUND OF THE INVENTION

Field of the Invention

The invention relates to an electronic apparatus including an image pickup apparatus, such as a digital camera and a digital video camera, and more particularly to an electronic apparatus provided with a plurality of tiers of rotation operation members.

Description of the Related Art

As an image pickup apparatus, such as a digital camera, there has been proposed one that is provided with two higher and lower tiers of operation dials in such a manner that the operation dials can be rotationally operated independently of each other (see Japanese Patent Laid-Open Publication No. 2010-67391).

In this proposal, a metal plate member that rotates in unison with the upper operation dial has a plurality of click holes formed therein, and the upper operation dial is provided with a ball and a spring which urges the ball toward the metal plate member, in an axial direction of the upper operation dial. When the upper operation dial is rotated, the ball climbs over one of the click holes of the metal plate member, and thereby generates a click force.

On the other hand, the lower operation dial is formed with a plurality of click grooves in a reverse side thereof, and a ball provided in an axial direction thereof is urged toward the lower operation dial by a spring. When the lower operation dial is rotated, the ball climbs over one of the click grooves, and thereby generates a click force.

In Japanese Patent Laid-Open Publication No. 2010-67391, the two higher and lower operation dials are both provided with the ball and the spring in the axial direction thereof so as to generate a click force, and hence the whole size of the two higher and lower operation dials in the axial direction is increased. For example, in a case where the two upper and lower tiers of operation dials are provided in a vertical direction with respect to an upper surface of a camera body, this results in an increases in the size of the whole camera in a direction of height thereof.

SUMMARY OF THE INVENTION

The invention provides a mechanism that achieves size reduction of an electronic apparatus by reducing the axial size of a plurality of tiers of rotation operation members that can be rotationally operated independently of each other.

The invention provides an electronic apparatus comprising a holder that is fixed to an exterior member, a first rotation operation member that is supported by the holder in a rotatable manner, a second rotation operation member that is disposed in a manner opposed to the first rotation operation member in an axial direction and is supported by the holder in a rotatable manner, a first click mechanism configured to generate a click force in a case where the first rotation operation member is rotationally operated, and a second click mechanism configured to generate a click force in a case where the second rotation operation member is rotationally operated, wherein the first click mechanism and the second click mechanism are arranged in a space in which the first rotation operation member and the second rotation operation member are opposed to each other in the axial direction.

According to the invention, it is possible to reduce the axial size of the plurality of tiers of rotation operation members that can be rotationally operated independently of each other, and hence it is possible to achieve size reduction of the electronic apparatus.

Further features of the invention will become apparent from the following description of exemplary embodiments (with reference to the attached drawings).

DESCRIPTION OF THE EMBODIMENTS

The invention will now be described in detail below with reference to the accompanying drawings showing embodiments thereof.

Figure 1:
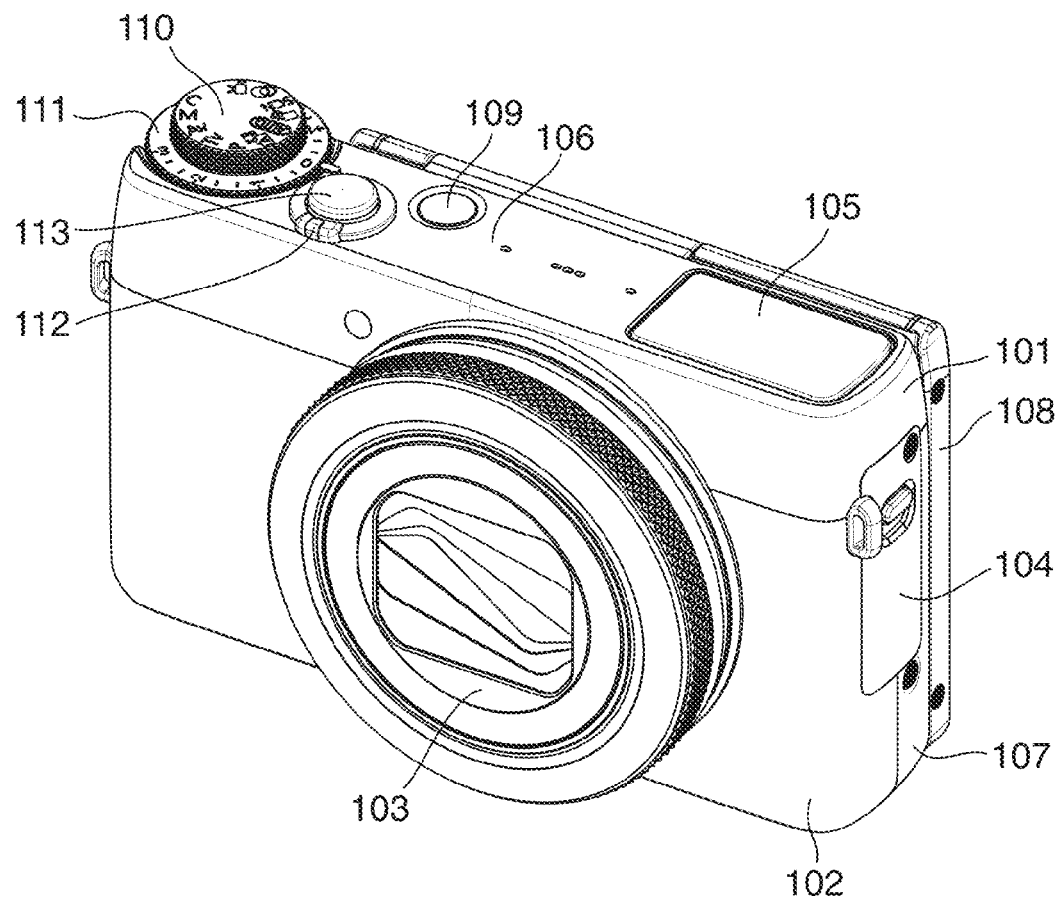
FIG. 1 is a perspective view of a digital camera as an electronic apparatus according to an embodiment of the invention, as viewed from the front (object side).

FIG. 1 is a perspective view of a digital camera as an electronic apparatus according to an embodiment of the invention, as viewed from the front (object side).

In the digital camera according to the present embodiment, as shown in FIG. 1, the exterior of a camera body 101 is formed by a front cover 102, a rear cover 107, a top cover 106, a right side cover 104, and a left side cover and a bottom cover, both of which are not shown.

The front side of the camera body 101 is provided with a lens barrel 103. Further, the top surface of the camera body 101 is provided with a power button 109, a mode dial 110, an exposure correction dial 111, a zoom lever 112, a release button 113, and a pop-up strobe unit 105. A display unit 108, such as an LCD, is supported on the rear side of the camera body 101 such that it can be rotated in an opening/closing direction respect to the camera body 101.

The mode dial 110 is an upper one of two (upper and lower) tiers of rotation operation members, and corresponds to a first rotation operation member of the invention, and in the present embodiment, the mode dial 110 is configured to enable a photographer to select a photographic mode of the camera by an operation of rotating the same. The exposure correction dial 111 is a lower one of the two (upper and lower) tiers of rotation operation members, and corresponds to a second rotation operation member of the invention, and in the present embodiment, the exposure correction dial 111 is configured to enable the photographer to select an exposure correction value for photographing by an operation of rotating the same.

Next, a description will be given of a rotation operation mechanism of the mode dial 110 and the exposure correction dial 111 with reference to FIGS. 2 to 6.

Figure 2:
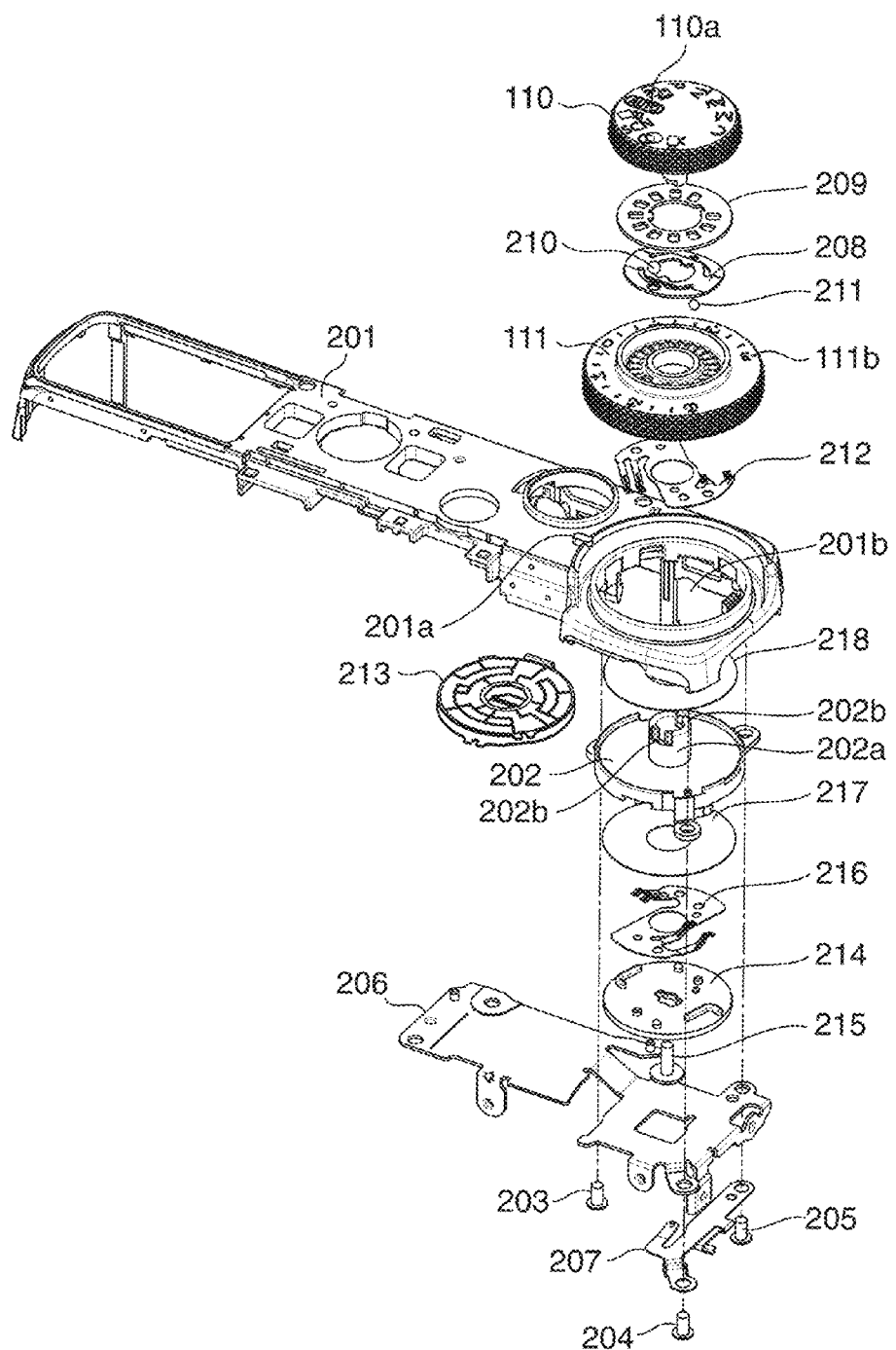
FIG. 2 is an exploded perspective view of a rotation operation mechanism of a mode dial and an exposure correction dial.
Figure 3:
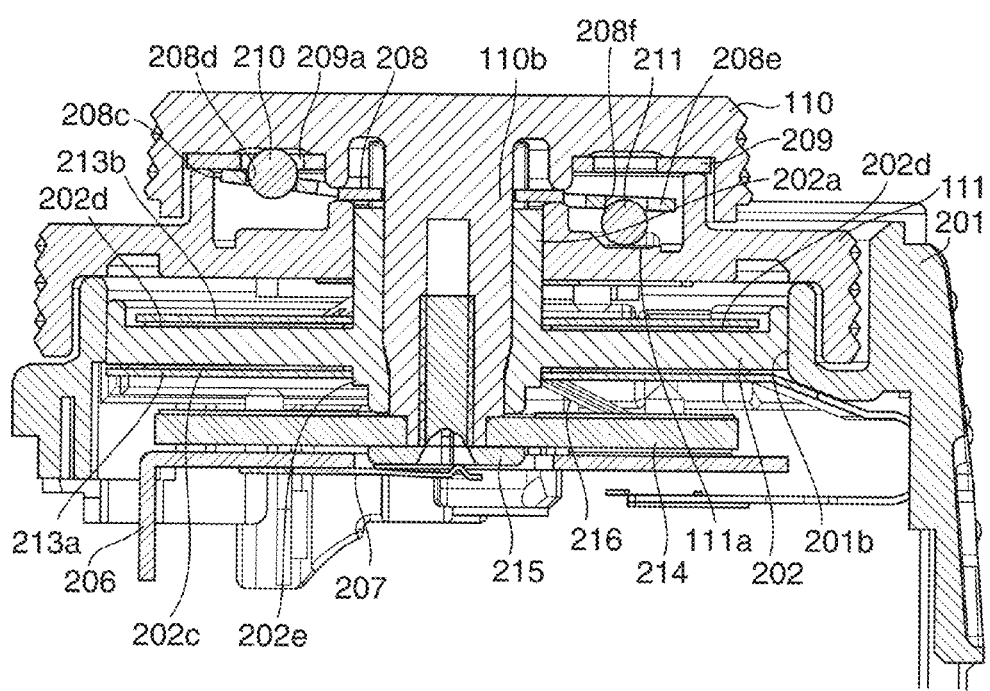
FIG. 3 is a cross-sectional view of a camera body with the mode dial and the exposure correction dial assembled thereto.
Figure 4:
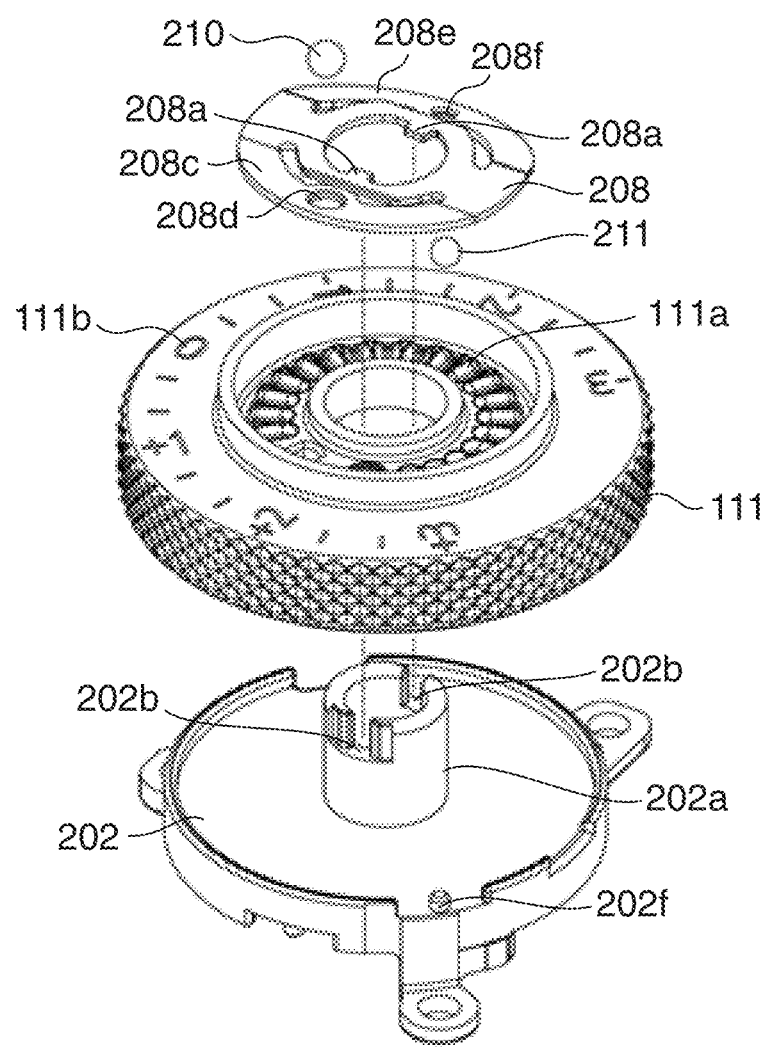
FIG. 4 is an exploded perspective view of the exposure correction dial, a holder, and a plate member, which is useful in explaining a positional relationship therebetween.
Figure 5:
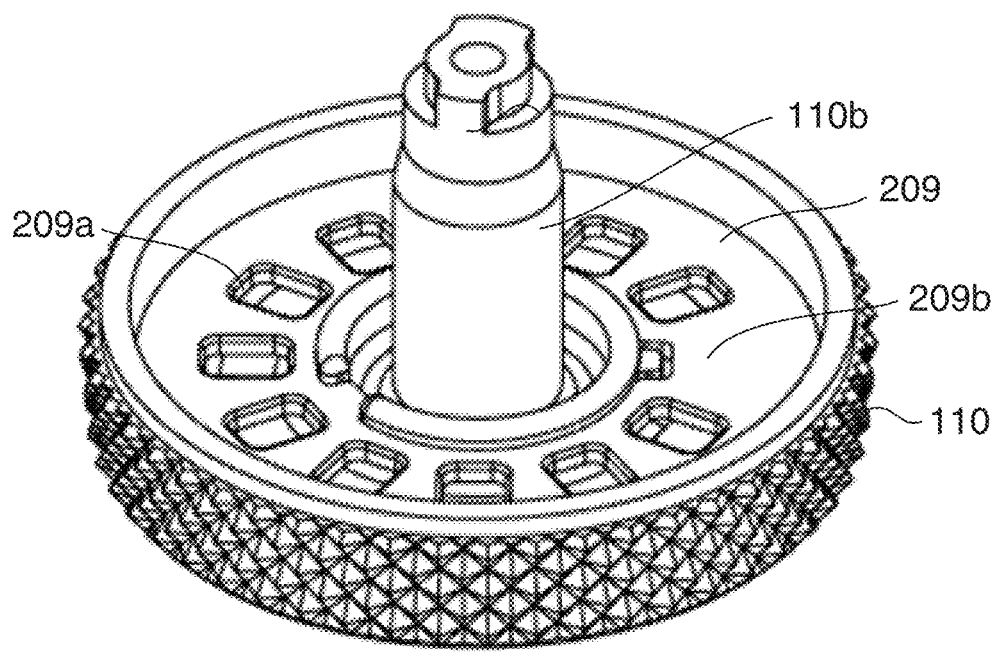
FIG. 5 is a perspective view of the mode dial, as viewed from the reverse side.
Figure 6:
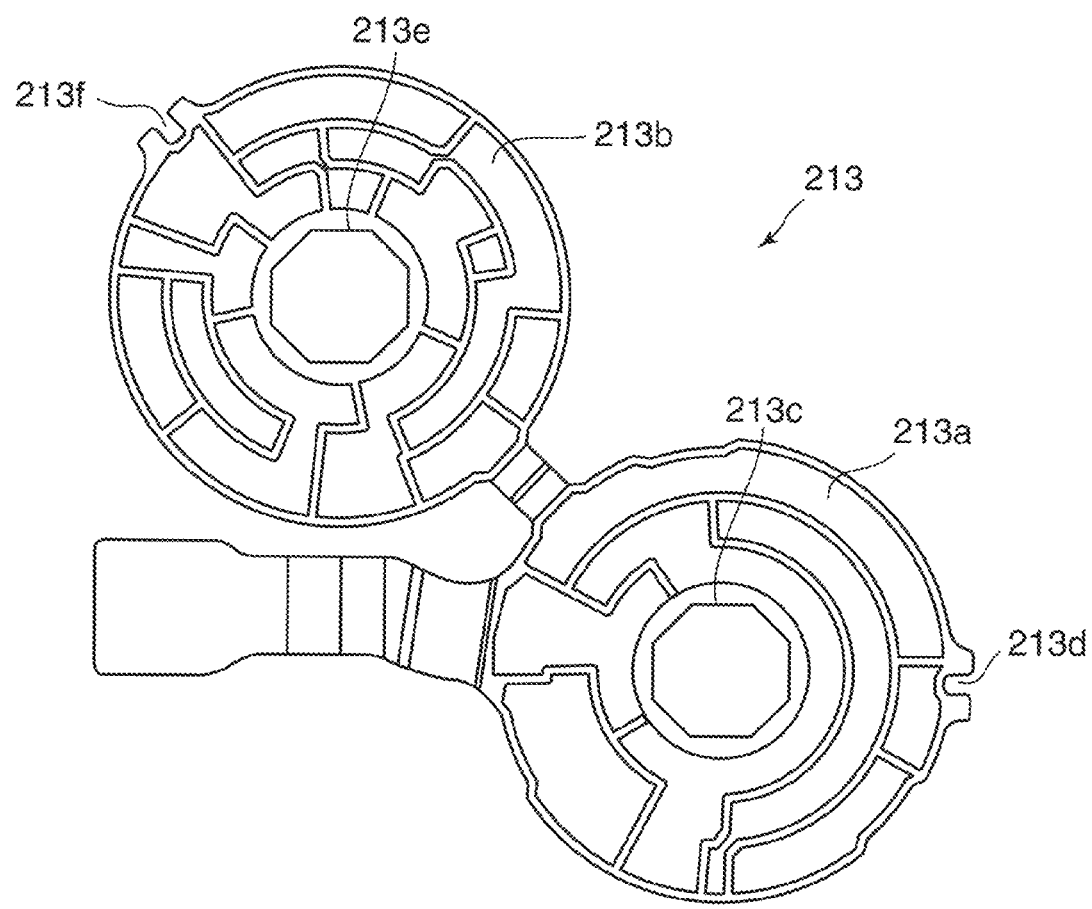
FIG. 6 is a development of a pattern board.

FIG. 2 is an exploded perspective view of the rotation operation mechanism of the mode dial 110 and the exposure correction dial 111. FIG. 3 is a cross-sectional view of the camera body 101 with the mode dial 110 and the exposure correction dial 111 assembled thereto. FIG. 4 is an exploded perspective view of the exposure correction dial 111, a holder 202, and a plate member 208, which is useful in explaining a positional relationship therebetween. FIG. 5 is a perspective view of the mode dial 110, as viewed from the reverse side. FIG. 6 is a development of a pattern board 213.

Referring to FIG. 2, a top base 201 forms part of the exterior of the upper surface of the camera body 101, and is fixed to a chassis, not shown, and the top cover 106 of the camera body 101 with screws. Note that the top base 201 corresponds to an exterior member of the invention.

The top base 201 is provided with an index 201a which functions as a mark for adjusting a mode printed portion 110a and an exposure correction printed portion 111b, described hereinafter, of the respective mode dial 110 and exposure correction dial 111. Further, the holder 202 having a shaft portion 202a is fixed to the top base 201, together with a base metal plate 206 and a grounding metal plate 207, with screws 203 to 205.

Referring to FIGS. 2 to 4, the shaft portion 202a of the holder 202 has a front end formed with two recessed portions 202b in a manner opposed to each other in a diametrical direction of the shaft portion 202a. Protruding portions 208a of the plate member 208 are fitted in the recessed portions 202b, respectively. With this arrangement, the plate member 208 is held in a state in which its rotation is restricted with respect to the holder 202.

The plate member 208 is formed of metal or the like in an annular shape, and the protruding portions 208a are formed in a manner protruding radially inward from an inner peripheral portion of the plate member 208. The protruding portions 208a are arranged at two locations opposed to each other in the diametrical direction of the plate member 208 in a manner corresponding to the locations of the recessed portions 202b, respectively.

Further, one side of the plate member 208 toward one of the two protruding portions 208a is bent toward the mode dial 110 (upward, as viewed in FIG. 4) and thereby forms a first elastic deformation portion 208c on the plate member 208.

The first elastic deformation portion 208c is formed with a first ball-accommodating portion 208d, and a first ball 210 is arranged between the first ball-accommodating portion 208d and a click metal plate 209 (see FIGS. 2 and 3). The click metal plate 209 is fixed to the reverse side of the mode dial 110, and is formed with a plurality of slits 209a in a direction of rotation of the mode dial 110. The first ball 210 is urged toward the click metal plate 209 (see FIG. 3) by the first elastic deformation portion 208c of the plate member 208.

The first elastic deformation portion 208c corresponds to a first urging portion of the invention, the first ball 210 corresponds to a first click member of the invention, and the slits 209a correspond to a first engaging section of the invention. Further, the first ball 210, the slits 209a, and the first elastic deformation portion 208c form a first click mechanism of the invention.

The other side of the plate member 208 toward the other of the two protruding portions 208a is bent in a direction away from the mode dial 110 (downward, as viewed in FIG. 4), and thereby forms a second elastic deformation portion 208e on the plate member 208.

The second elastic deformation portion 208e is formed with a second ball-accommodating portion 208f, and a second ball 211 is arranged between the second ball-accommodating portion 208f and click grooves 111a of the exposure correction dial 111. The click grooves 111a are formed in plurality in a direction of rotation of the exposure correction dial 111. The second ball 211 is urged toward the exposure correction dial 111 by the second elastic deformation portion 208e of the plate member 208.

The second elastic deformation portion 208e corresponds to a second urging portion of the invention, the second ball 211 corresponds to a second click member of the invention, and the click grooves 111a correspond to a second engaging section of the invention. Further, the second ball 211, the click grooves 111a, and the second elastic deformation portion 208e form a second click mechanism of the invention.

The exposure correction dial 111 is printed with the exposure correction printed portion 111b along the circumference thereof, for enabling the photographer to select an exposure correction value therefrom. The exposure correction dial 111 is rotatably fitted on the shaft portion 202a of the holder 202, and the holder 202 is fixedly fitted in a through hole 201b of the top base 201. In this state, the exposure correction dial 111 is supported on the shaft portion 202a of the holder 202 such that it can be operated between the mode dial 110 and the top base 201 for rotation about the shaft portion 202a of the holder 202.

The above-described click grooves 111a of the exposure correction dial 111 are formed in plurality along the circumferential direction in a side of the exposure correction dial 111 (front side) axially opposed to the mode dial 110 in a manner corresponding to stop positions of the exposure correction dial 111. Each click groove 111a has opposite side walls each formed into a slope so as to enable the second ball 211 to move up and down.

A second contact piece 212 is fixed on a reverse side of the exposure correction dial 111 e.g. by welding. The second contact piece 212 is electrically connected to the pattern board 213, and is rotated in unison with the exposure correction dial 111.

Note that in the present embodiment, the exposure correction dial 111 is formed of a resin component, and hence the second contact piece 212 is directly fixed to the exposure correction dial 111 by thermal welding. However, in a case where the exposure correction dial 111 is formed of e.g. a metallic component, the second contact piece 212 may be fixed to the exposure correction dial 111 via a resin component, such as a spacer.

The second ball 211 is engaged in one of the click grooves 111a of the exposure correction dial 111, whereby the exposure correction dial 111 is caused to stop at a desired position during rotating operation of the exposure correction dial 111 and also a click force is generated. As described hereinabove, the second ball 211 is urged toward one of the click grooves 111a by the second elastic deformation portion 208e of the plate member 208.

As the photographer rotates the exposure correction dial 111, the second ball 211 urged toward one of the click grooves 111a by the second elastic deformation portion 208e starts to ascends a side wall slope of the one click groove 111a against the urging force of the second elastic deformation portion 208e.

Then, when the photographer stops rotation of the exposure correction dial 111 after aligning an exposure correction value, adjacent to the precedingly selected one, of the exposure correction printed portion 111b, with the index 201a of the top base 201, the second ball 211 descends a side wall slope of an adjacent one of the click grooves 111a by the urging force of the second elastic deformation portion 208e. This causes the second ball 211 to be engaged in the adjacent one of the click grooves 111a in the direction of rotation of the exposure correction dial 111 and stops.

At this time, the position of the click groove 111a in which the second ball 211 is engaged and the position of the selected exposure correction value of the exposure correction printed portion 111b coincide with the index 201a of the top base 201. Thus, when the second ball 211 climbs over the side wall slope of the click groove 111a and is engaged in the adjacent click groove 111a, the click force is transmitted to the finger of the photographer.

Referring to FIGS. 2, 3, and 5, the front side of the mode dial 110 is provided with the mode printed portion 110a which is printed along the circumference thereof. The mode dial 110 has a shaft portion 110b which is rotatably fitted in the shaft portion 202a of the holder 202, and with this arrangement, the mode dial 110 is supported by the shaft portion 202a of the holder 202 in a rotationally operable manner. Note that in the present embodiment, the rotational shaft of the mode dial 110 and the rotational shaft of the exposure correction dial 111 are co-axially arranged.

A first holder 214 which is rotated in unison with the mode dial 110 is positioned and fixed to an extreme end (lower end, as viewed in FIG. 3) of the shaft portion 110b of the mode dial 110 with a screw 215. Further, a side of the first holder 214, which faces the mode dial 110, has a first contact piece 216 fixed thereto e.g. by thermal welding. The first contact piece 216 is electrically connected to the pattern board 213, and is rotated in unison with the mode dial 110 and the first holder 214.

The first ball 210 is engaged in one of the slits 209a of the first click metal plate 209, whereby the mode dial 110 is stopped at a desired position during rotating operation of the mode dial 110, and also a click force is generated. As described hereinabove, the first ball 210 is urged toward the first click metal plate 209 by the first elastic deformation portion 208c of the plate member 208.

As the photographer rotates the mode dial 110, the first ball 210 engaged in one of the slits 209a by the urging force of the first elastic deformation portion 208c climbs over the one slit 209a, moves downward, and slides on a flat portion 209b leading to an adjacent slit 209a. Then, when the photographer stops rotation of the mode dial 110 after aligning a display, adjacent to the precedingly selected display, of the mode printed portion 110a of the mode dial 110, with the index 201a of the top base 201, the first ball 210 is engaged in the adjacent slit 209a by the urging force of the first elastic deformation portion 208c, moves upward, and then stops.

At this time, the position of the slit 209a in which the first ball 210 is engaged and the position of the selected display of the mode printed portion 110a coincide with the index 201a of the top base 201. When the first ball 210 climbs over the slit 209a and is engaged in the adjacent slit 209a, the click force is transmitted to the finger of the photographer.

Note that in the present embodiment, the mode dial 110 and the exposure correction dial 111 can be rotationally operated through 360 degrees (along the whole circumference). The photographer can change the photographic mode or the exposure correction value by aligning a desired display of the mode printed portion 110a of the mode dial 110 or a desired exposure correction value of the exposure correction printed portion 111b of the exposure correction dial 111 with the index 201a of the top base 201.

Further, by adjusting the outer diameters of the first ball 210 and the second ball 211, and the material, shape, bending dimension, etc. of the plate member 208, it is possible to change a contact force between the first ball 210 and the first click metal plate 209, and a contact force between the second ball 211 and the exposure correction dial 111. This makes it possible to change and adjust the rotational torque of each of the mode dial 110 and the exposure correction dial 111.

Next, the pattern board 213 will be described with reference to FIGS. 2, 3, and 6. The pattern board 213 is arranged between the first holder 214 and the exposure correction dial 111, in the axial direction of the shaft portion 202a of the holder 202. The pattern board 213 is formed with a first pattern portion 213a which is brought into contact with the first contact piece 216, and a second pattern portion 213b which is brought into contact with the second contact piece 212 on the same side (single side) (see the development in FIG. 6).

Further, the pattern board 213 is bent into a state sandwiching opposite sides (upper and lower surfaces as viewed in FIG. 3) of the holder 202 in the axial direction in such a manner that the first pattern portion 213a is opposed to and brought into contact with the first contact piece 216 and the second pattern portion 213b is opposed to and brought into contact with the second contact piece 212.

Specifically, in the present embodiment, a portion of the pattern board 213, on which the first pattern portion 213a is formed, is fixed to a reverse side (lower surface as viewed in FIG. 3) 202c of the holder 202 with a double-sided tape 217 (see FIG. 2). Further, a portion of the pattern board 213, on which the second pattern portion 213b is formed, is fixed on a front side (upper surface as viewed in FIG. 3) 202d of the holder 202 with a double-sided tape 218 (see FIG. 2).

As shown in FIG. 6, the portion of the pattern board 213, on which the first pattern portion 213a is formed, is formed with a first positioning hole 213c in a substantially central portion, and is formed with a first rotation stop portion 213d on an outer peripheral portion. As shown in FIG. 3, the first positioning hole 213c is fitted on and positioned by a shaft portion 202e extending from the reverse side 202c of the holder 202, and the first rotation stop portion 213d is positioned by a boss, not shown, which is provided on the outer peripheral side of the reverse side 202c of the holder 202 in a protruding manner.

The first positioning hole 213c is formed in the substantially central portion of the first pattern portion 213a, whereby it is possible to form the first rotation stop portion 213d as a cutout having a U-shape on the outer peripheral side of the first pattern portion 213a. This makes it possible to reduce the diameter of the first pattern portion 213a in the radial direction.

Similarly, the portion of the pattern board 213, on which the second pattern portion 213b is formed, is formed with a second positioning hole 213e in the substantially central portion, and is formed with a second rotation stop portion 213f on an outer peripheral portion. As shown in FIG. 3, the second positioning hole 213e is fitted on and positioned by the shaft portion 202a extending from the front side 202d of the holder 202, and the second rotation stop portion 213f is positioned by a boss 202f which is provided on the outer peripheral side of the front side 202d of the holder 202 in a protruding manner.

The second positioning hole 213e is formed in the substantially central portion of the second pattern portion 213b, whereby it is possible to form the second rotation stop portion 213f as a cutout having a U-shape on the outer peripheral side of the second pattern portion 213b. This makes it possible to reduce the diameter of the second pattern portion 213b in the radial direction.

The pattern board 213 is electrically connected to a control circuit, not shown, of the camera body 101. Further, the first pattern portion 213a and the second pattern portion 213b of the pattern board 213 are portions on which copper foil is exposed, and are configured to be switched between contact and non-contact with respect to the first contact piece 216 and the second contact piece 212, respectively.

In FIGS. 2 and 3, the base metal plate 206 is fastened to the chassis (not shown) of the camera body 101 with screws (not shown), and is electrically connected to the ground of the camera body 101. The grounding metal plate 207 is a plate spring which urges the screw 215 which fastens the mode dial 110 and the first holder 214, and is electrically connected to the mode dial 110. As described hereinabove, the grounding metal plate 207 is fixed to the top base 201 together with the holder 202 and the base metal plate 206, with the screws 203 to 205.

With this arrangement, the mode dial 110 is electrically connected to the base metal plate 206 via the grounding metal plate 207, and is at the same ground level as the pattern board 213. As a result, even when static electricity is applied to the mode dial 110 or its vicinity, signal lines arranged in the vicinity of the mode dial 110 become less liable to be influenced by the static electricity, which improves the resistance properties of the whole camera.

As described heretofore, in the present embodiment, click mechanisms each of which causes a click force to be generated when an associated one of the mode dial 110 and the exposure correction dial 111 is rotated are arranged in a space in which the mode dial 110 and the exposure correction dial 111 are opposed to each other in the axial direction. This makes it possible to reduce the axial size of the mode dial 110 and the exposure correction dial 111, which are the two (upper and lower) rotation operation members which can be rotationally operated independently of each other, which makes it possible to achieve size reduction of the camera.

Further, in the present embodiment, it is possible to reduce the diameters of the first pattern portion 213a and the second pattern portion 213b of the pattern board 213, and hence it is possible to arrange the holder 202 holding the pattern board 213 within the inner periphery of the exposure correction dial 111. This makes it possible to further reduce the mode dial 110 and the exposure correction dial 111 in dimension in the axial direction.

Further, in the present embodiment, the mode dial 110 and the exposure correction dial 111 can be rotationally operated through 360 degrees independently of each other, and hence it is possible to apply the mechanism of the mode dial 110 and the exposure correction dial 111 not only to switching of the photographic mode and the exposure correction value, but also to various types of parameter setting, which increases the degree of freedom of design.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-175510 filed Aug. 29, 2014, which is hereby incorporated by reference herein in its entirety.

What is claimed is:

1. An electronic apparatus comprising:
an image pickup apparatus including:
a holder that is fixed to an exterior member;
a first rotation operation member that is supported by said holder in a rotatable manner;
a second rotation operation member that is disposed in a manner opposed to said first rotation operation member in an axial direction and is supported by said holder in a rotatable manner;
a first click mechanism configured to generate a click force in a case where said first rotation operation member is rotationally operated; and
a second click mechanism configured to generate a click force in a case where said second rotation operation member is rotationally operated,
wherein said first click mechanism and said second click mechanism are arranged in a space in which said first rotation operation member and said second rotation operation member are opposed to each other in the axial direction,
wherein said first click mechanism comprises:
a first click member;
first engagement portions provided in plurality in said first rotation operation member in a direction of rotation of said first rotation operation member, for engagement with said first click member; and
a first urging portion that includes a portion for accommodating said first click member, and urges said first click member toward said first engagement portions,
wherein said second click mechanism comprises:
a second click member;
second engagement portions provided in plurality in said second rotation operation member in a direction of rotation of said second rotation operation member, for engagement with the second click member; and
a second urging portion that includes a portion for accommodating said second click member, and urges said second click member toward said second engagement portions, and
wherein said first urging portion and said second urging portion are formed integrally with a plate member fixed to said holder,
wherein said first urging portion formed on said olate member is bent upward and said second urging portion formed on said olate member is bent downward.

2. The electronic apparatus according to claim 1, wherein said first urging portion formed on said plate member is bent toward said first rotation operation member, and
wherein said second urging portion formed on said plate member is bent toward said second rotation operation member.

3. The electronic apparatus according to claim 1, wherein said first engagement portions are formed in a click plate fixed to said first rotation operation member.

4. The electronic apparatus according to claim 1, wherein said second engagement portions are formed in said second rotation operation member.

5. The electronic apparatus according to claim 1, further comprising a first contact piece that is rotated in unison with said first rotation operation member;
a second contact piece that is rotated in unison with said second rotation operation member, and
a pattern board having a first pattern portion and a second pattern portion formed on a same surface thereof,
wherein said pattern board is arranged in a manner bent into a state sandwiching opposite sides of said holder in the axial direction between the first pattern portion and the second pattern portion in such a manner that the first pattern portion is brought into contact with said first contact piece, and the second pattern portion is brought into contact with said second contact piece.

6. The electronic apparatus according to claim 1, wherein said holder is arranged within an inner periphery of said second rotation operation member.

7. The electronic apparatus according to claim 1, wherein a rotational shaft of said first rotation operation member and a rotational shaft of said second rotation operation member are co-axially arranged.

\* \* \* \* \*